(12) United States Patent
Fujikawa et al.

(10) Patent No.: US 12,183,092 B2
(45) Date of Patent: Dec. 31, 2024

(54) INFORMATION PROCESSING APPARATUS, CONTROL METHOD, AND COMPUTER-READABLE MEDIUM

(71) Applicant: Panasonic Intellectual Property Management Co., Ltd., Osaka (JP)

(72) Inventors: Satoshi Fujikawa, Kanagawa Ken (JP); Kazuhiko Yamauchi, Osaka Fu (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 23 days.

(21) Appl. No.: 18/123,716

(22) Filed: Mar. 20, 2023

(65) Prior Publication Data

US 2023/0306755 A1    Sep. 28, 2023

(30) Foreign Application Priority Data

Mar. 24, 2022 (JP) ................. 2022-049070
Feb. 1, 2023 (JP) ................. 2023-013752

(51) Int. Cl.
| | |
|---|---|
| *G06V 20/59* | (2022.01) |
| *G01C 21/36* | (2006.01) |
| *G05D 1/00* | (2006.01) |
| *G06T 7/20* | (2017.01) |
| *G06V 40/20* | (2022.01) |

(52) U.S. Cl.
CPC ......... *G06V 20/59* (2022.01); *G01C 21/3605* (2013.01); *G01C 21/3629* (2013.01); *G05D 1/021* (2013.01); *G06T 7/20* (2013.01); *G06V 40/20* (2022.01); *G06T 2207/30268* (2013.01)

(58) Field of Classification Search
CPC .... G06V 20/59; G06V 40/20; G01C 21/3605; G01C 21/3629; G05D 1/021; G06T 7/20
See application file for complete search history.

(56) References Cited

U.S. PATENT DOCUMENTS

| | | | |
|---|---|---|---|
| 6,393,348 B1 | 5/2002 | Ziegler et al. | |
| 9,610,893 B2* | 4/2017 | Lopez-Hinojosa | ... H04W 76/10 |
| 2002/0022979 A1* | 2/2002 | Whipp | ................. G06Q 10/02 |
| | | | 705/5 |
| 2013/0184932 A1* | 7/2013 | Dove | ................. H04N 21/4542 |
| | | | 701/36 |

(Continued)

FOREIGN PATENT DOCUMENTS

JP    2003-312342 A    11/2003

*Primary Examiner* — Mishawn N. Hunter
(74) *Attorney, Agent, or Firm* — GREENBLUM & BERNSTEIN, P.L.C.

(57) ABSTRACT

According to the present disclosure, an information processing apparatus communicates with a sensor device that transmits a video of a passenger and environmental information at least when a vehicle is moving. The information processing apparatus includes a memory, and a hardware processor coupled to the memory. The hardware processor being configured to: receive the video and the environmental information from the sensor device; output the received video; analyze information regarding a behavior sign of the passenger based on at least one of the received video and a change in the environmental information accompanying movement of the vehicle; and perform output control of changing an output way and outputting message information, based on an analysis result of the behavior sign.

6 Claims, 13 Drawing Sheets

(56) References Cited

U.S. PATENT DOCUMENTS

| | | | | |
|---|---|---|---|---|
| 2014/0135598 A1* | 5/2014 | Weidl | ............... | A61B 5/48 |
| | | | | 600/300 |
| 2015/0279177 A1* | 10/2015 | Hyde | ............... | G16H 20/60 |
| | | | | 340/815.4 |
| 2015/0330802 A1* | 11/2015 | Ono | ............... | B60W 50/14 |
| | | | | 701/431 |
| 2022/0180726 A1* | 6/2022 | Bender | ............... | G08B 7/06 |
| 2022/0357172 A1* | 11/2022 | Lang | ............... | G01C 21/3484 |

* cited by examiner

FIG.5A
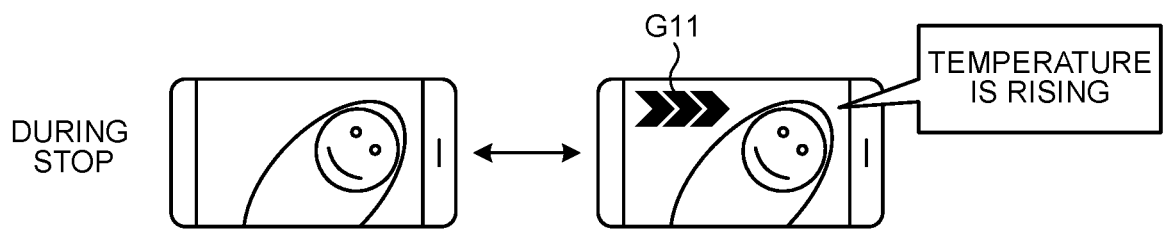
FIG.5B
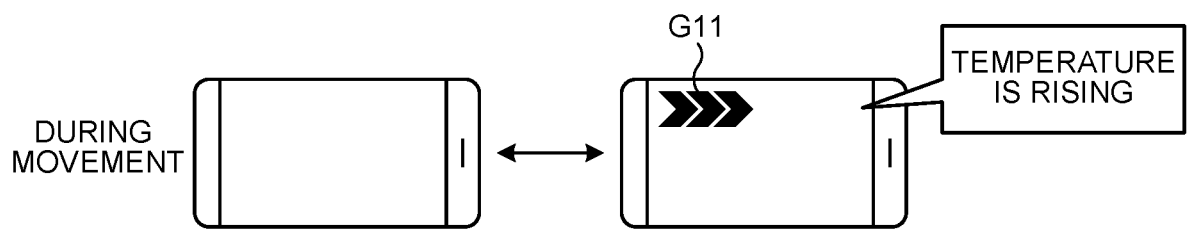
FIG.5C
|  | THERE IS SIGN | NO SIGN |
|---|---|---|
| STOP | AUDIO ON<br>MAIN VIDEO ON<br>SUB VIDEO ON | AUDIO OFF<br>MAIN VIDEO ON<br>SUB VIDEO OFF |
| MOVEMENT | AUDIO ON<br>MAIN VIDEO OFF<br>SUB VIDEO ON | AUDIO OFF<br>MAIN VIDEO OFF<br>SUB VIDEO OFF |

FIG.6A
DURING STOP

REAR SEAT VIDEO

FIG.6B
DURING MOVEMENT

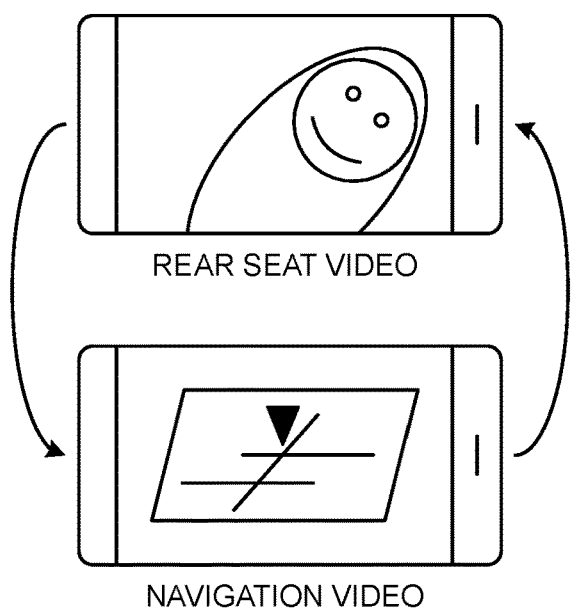

REAR SEAT VIDEO

NAVIGATION VIDEO

FIG.6C

|  | THERE IS SIGN | NO SIGN |
|---|---|---|
| STOP | AUDIO ON<br>MAIN VIDEO ON<br>SUB VIDEO ON | AUDIO OFF<br>MAIN VIDEO ON<br>SUB VIDEO OFF |
| MOVEMENT A | AUDIO ON<br>MAIN VIDEO ON<br>SUB VIDEO ON | AUDIO OFF<br>MAIN VIDEO ON<br>SUB VIDEO OFF |
| MOVEMENT B | AUDIO OFF<br>MAIN VIDEO OFF<br>SUB VIDEO OFF | AUDIO OFF<br>MAIN VIDEO OFF<br>SUB VIDEO OFF |

FIG.7A
|  |  | NAVIGATION DEVICE | |
|---|---|---|---|
|  |  | WITH AUDIO OUTPUT | WITHOUT AUDIO OUTPUT |
| INFORMATION PROCESSING APPARATUS | AUDIO OUTPUT | OFF | ON |
FIG.7B
|  |  | DRIVING ASSIST DEVICE | |
|---|---|---|---|
|  |  | WITH AUDIO OUTPUT | WITHOUT AUDIO OUTPUT |
| INFORMATION PROCESSING APPARATUS | AUDIO OUTPUT | OFF | ON |
FIG.8A
FIG.8B
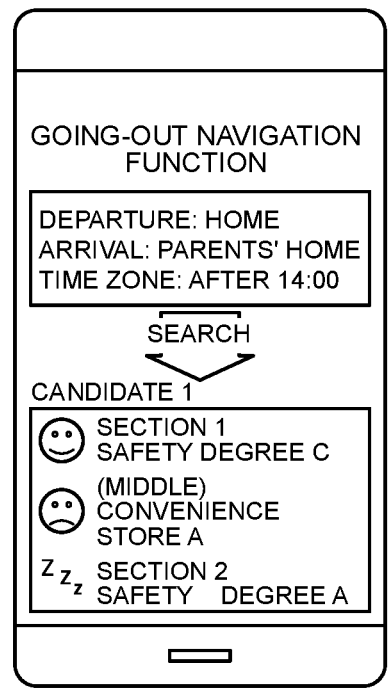

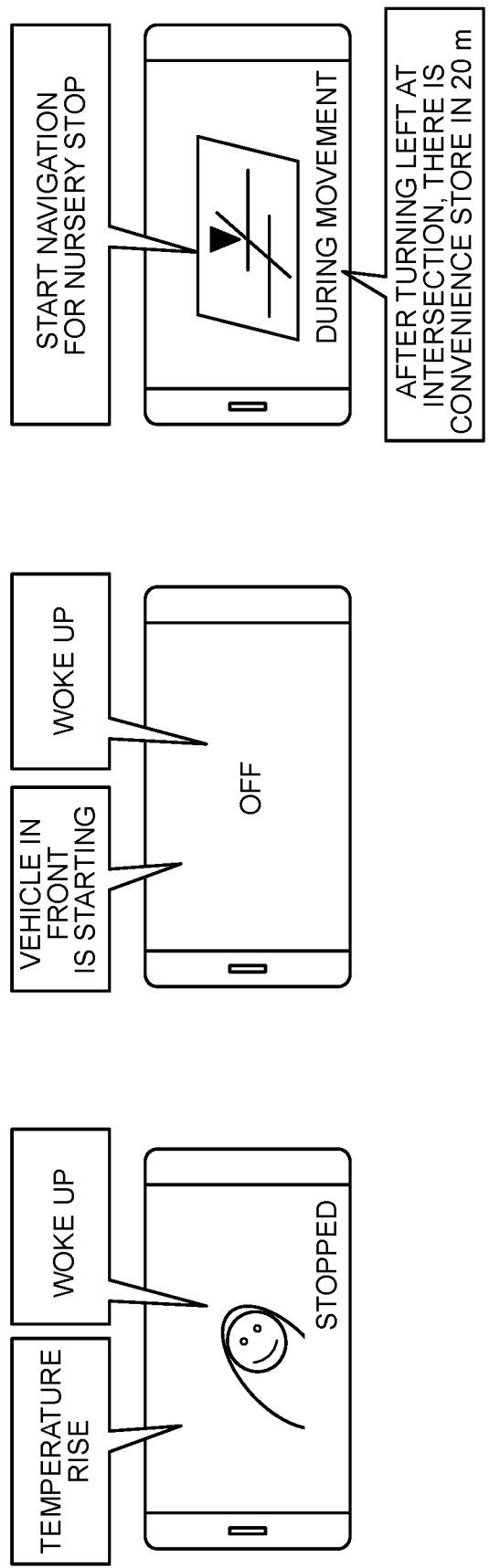

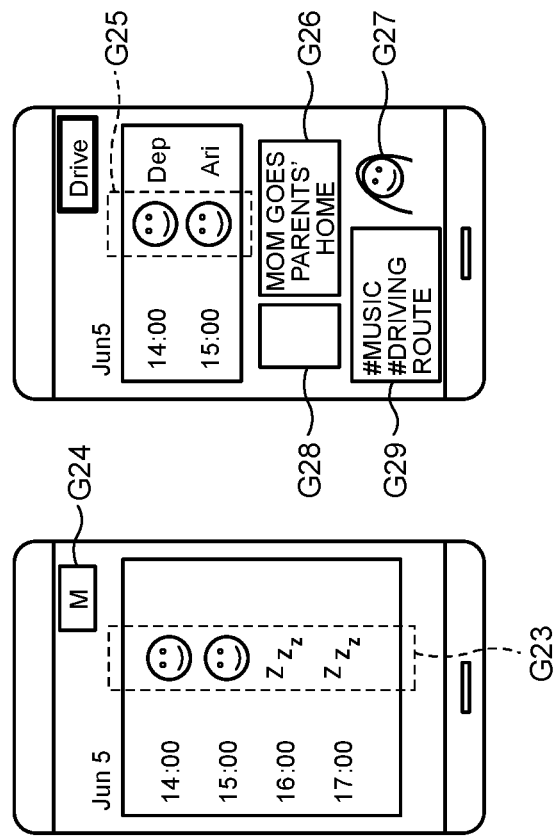
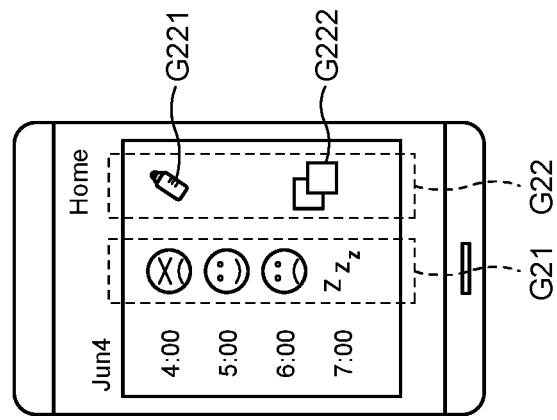
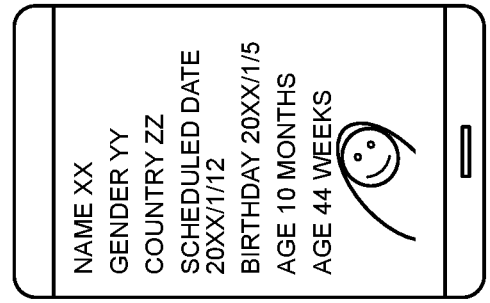

FIG.12A
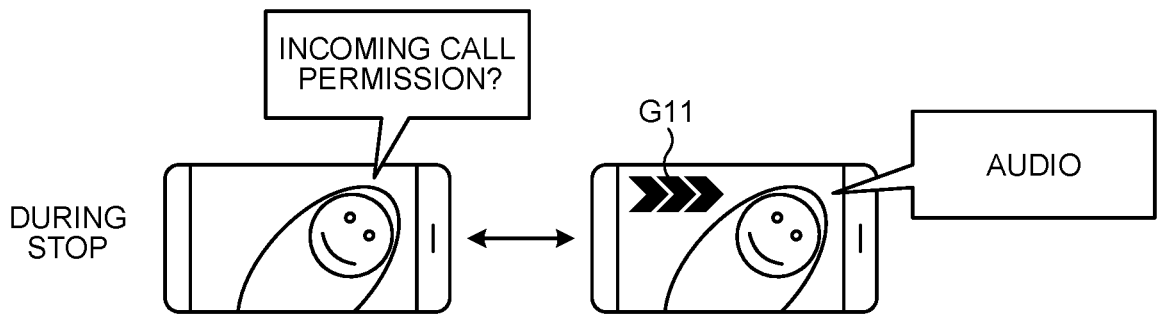
FIG.12B
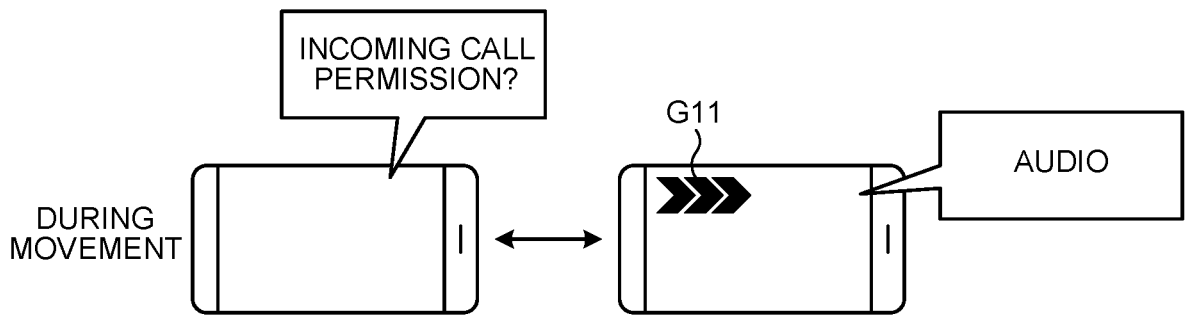
FIG.12C
|  | THERE IS SIGN | NO SIGN |
|---|---|---|
| STOP | AUDIO ON<br>MAIN VIDEO ON<br>SUB VIDEO OFF | AUDIO ON<br>MAIN VIDEO OFF<br>SUB VIDEO ON |
| MOVEMENT | AUDIO OFF<br>MAIN VIDEO ON<br>SUB VIDEO OFF | AUDIO OFF<br>MAIN VIDEO OFF<br>SUB VIDEO ON |

INFORMATION PROCESSING APPARATUS, CONTROL METHOD, AND COMPUTER-READABLE MEDIUM

CROSS-REFERENCE TO RELATED APPLICATIONS

This application is based upon and claims the benefit of priority from Japanese Patent Application No. 2022-049070, filed on Mar. 24, 2022 and Japanese Patent Application No. 2023-013752, filed on Feb. 1, 2023, the entire contents of which are incorporated herein by reference.

FIELD

The present disclosure relates to an information processing apparatus, a control method, and a computer-readable medium.

BACKGROUND

As a conventional device for watching over an infant sitting in a baby chair on a rear seat, a baby mirror and a baby monitor are known (See, for example, JP 2003-312342 A.).

However, in the conventional baby mirror and the baby monitor, a driver can simply check the current state of a passenger, and it is not possible to predict a behavior such as fussing, crying, or excretion of the infant during driving, and the driver needs to drive while feeling uneasy about a response in an emergency. For this reason, the driver cannot enjoy going out with the passenger, and there is a risk of inattentive driving, and there is also a problem in terms of safe driving.

The present disclosure has been made to solve conventional problems, and an object of the present disclosure is to provide an information processing apparatus, a control method, and a computer-readable medium capable of reducing stress of a driver on a passenger, enjoying going out with the passenger, and performing safe driving.

SUMMARY

According to the present disclosure, an information processing apparatus communicates with a sensor device that transmits a video of a passenger and environmental information at least when a vehicle is moving. The information processing apparatus includes a memory, and a hardware processor coupled to the memory. The hardware processor being configured to: receive the video and the environmental information from the sensor device; output the received video; analyze information regarding a behavior sign of the passenger based on at least one of the received video and a change in the environmental information accompanying movement of the vehicle; and perform output control of changing an output way and outputting message information, based on an analysis result of the behavior sign.

BRIEF DESCRIPTION OF THE DRAWINGS

FIGS. 5A to 5C are explanatory diagrams of behavior sign display in the first embodiment;

FIGS. 6A to 6C are explanatory diagrams of a main video transition according to the first embodiment;

FIGS. 7A and 7B are setting diagrams of output control in the first embodiment;

FIGS. 8A and 8B are explanatory diagrams of a user interface before boarding in the first embodiment;

FIGS. 9A to 9C are explanatory diagrams of a user interface while riding according to the first embodiment;

FIGS. 10A to 10D are an explanatory diagrams of a user interface for a childcare record in the first embodiment;

FIGS. 12A to 12C are explanatory diagrams of interactive processing in the first embodiment;

DETAILED DESCRIPTION

First Embodiment

Hereinafter, an outline of a system according to a first embodiment of the present disclosure will be described with reference to the drawings.

Figure 1:
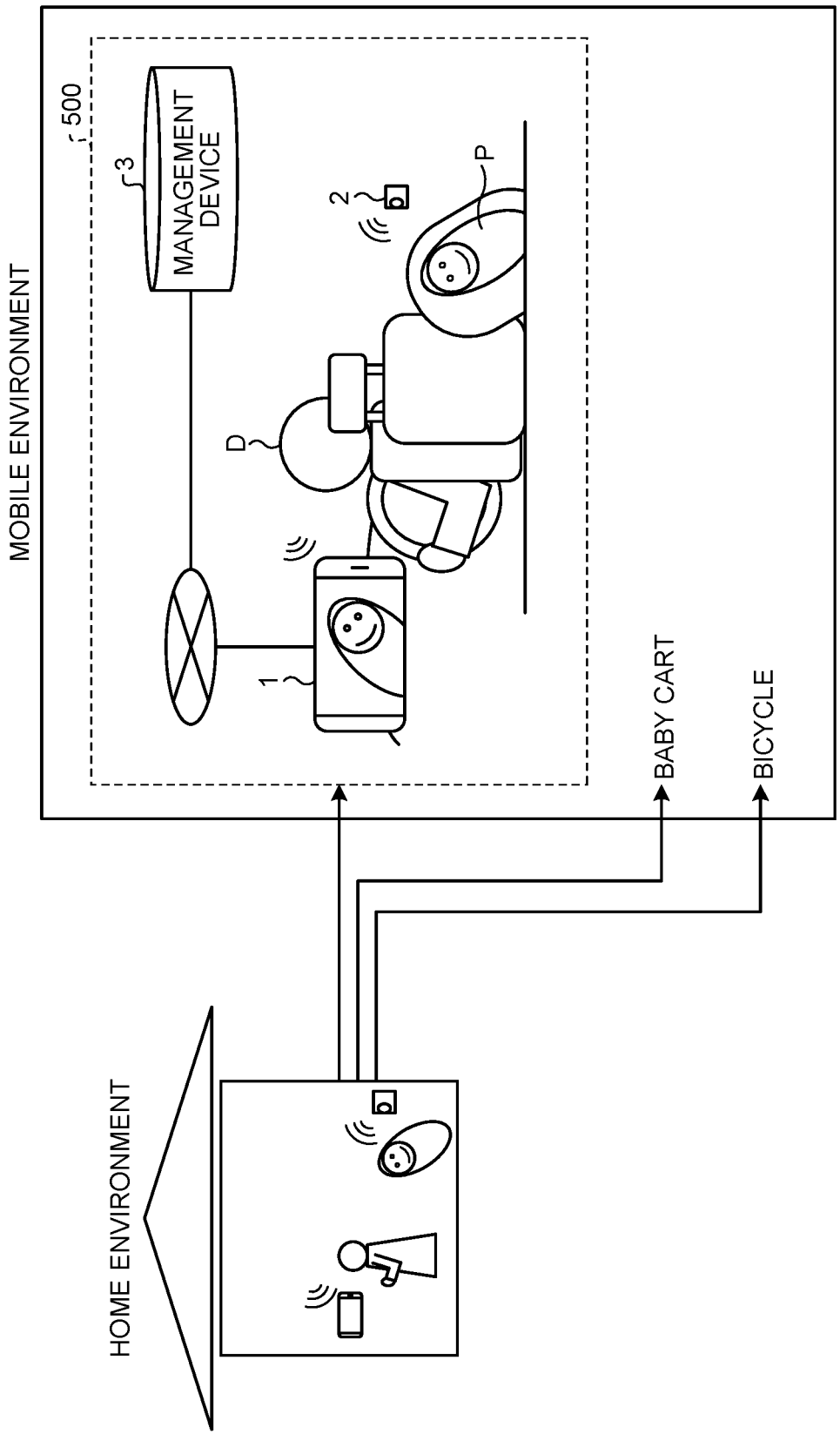
FIG. 1 is an explanatory diagram for explaining an outline of a system according to a first embodiment.

FIG. 1 is an explanatory diagram of an outline of a system according to a first embodiment.

In FIG. 1, a system 500 is used in environments including a mobile environment and pre- and post-environments of the mobile environment. There is a home environment as the pre- and post-environments.

The mobile environment includes an interior of an automobile, a baby cart, a bicycle in which a passenger P can sit on a rear seat, a two-wheeled vehicle, and the like.

In FIG. 1, the system 500 includes an information processing apparatus 1, a sensor device 2, and a management device 3. The information processing apparatus 1 and the sensor device 2 perform short-distance communication. The information processing apparatus 1 is connected to the management device 3, which is a cloud, via a network.

The information processing apparatus 1 is placed in front of a front seat.

The information processing apparatus 1 may be incorporated in a dashboard or an instrument panel similarly to a car navigation device or a drive recorder. Furthermore, the information processing apparatus 1 may be incorporated in a car navigation device or a drive recorder, and may share a display unit or a housing with these devices. Furthermore, the information processing apparatus 1 may be incorporated in a dashboard or an instrument panel as an independent in-vehicle infortainment (IVI).

The sensor device 2 is installed around or adjacent to a passenger P in the rear seat. In a case where the passenger P in the rear seat is an infant and the baby seat is installed so as to face rearward, the sensor device 2 is attached, for example, around the rear window and at a place where the face of the passenger P in the rear seat can be imaged.

If the sensor device 2 is a child seat on which the passenger P in the rear seat sits facing forward, the sensor device 2 is attached to a rear surface of the headrest of the driver seat at a position where the face of the passenger P can be imaged. Note that the sensor device 2 may be attached as a part of a baby seat or a child seat. The sensor device 2 may be attached to the ceiling of the vehicle as long as the rear seat can be imaged.

Figure 2:
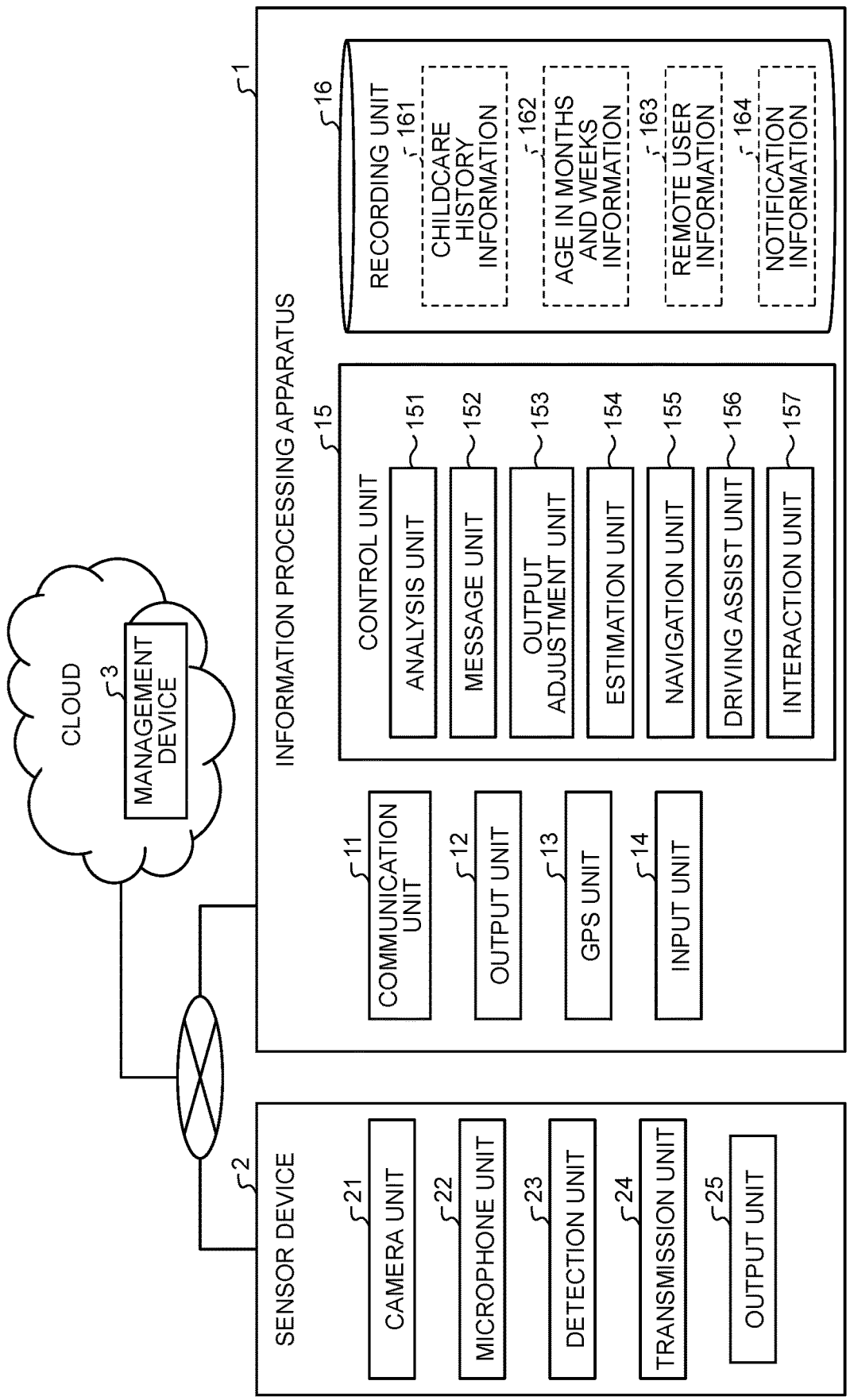
FIG. 2 is a functional block diagram of the system according to the first embodiment.

FIG. 2 is a block diagram illustrating functional configurations of the information processing apparatus 1 and the sensor device 2.

Hereinafter, each configuration of the information processing apparatus 1 and the sensor device 2 will be described with reference to FIG. 2.

1. Information Processing Apparatus 1

The information processing apparatus 1 includes a display, a random access memory (RAM), a read only memory (ROM), and a central processing unit (CPU), and is a dedicated device having a built-in application or a device including a smartphone and an installed application. Note that the information processing apparatus 1 may be realized by a watch or a glass-type wearable device.

The information processing apparatus 1 includes a communication unit 11, an output unit 12, a position information acquisition unit 13, an input unit 14, a control unit 15, and a recording unit 16. Each configuration will be described below.

1.1 Communication Unit 11

The communication unit 11 communicates with the management device 3, which is a cloud, via a network. The communication unit 11 may communicate with intelligent transport systems (ITS) installed on a road or surrounding vehicles. The communication unit 11 communicates with the sensor device 2 by short-distance communication. That is, the communication unit 11 receives the video and the environmental information from the sensor device 2. As the short-range communication, there are systems such as Wi-Fi (registered trademark) and Bluetooth (registered trademark). Furthermore, the communication unit 11 may perform communication by wired communication instead of wireless communication. The communication unit 11 performs long-distance wireless communication with the management device 3, ITS, and other vehicles. Examples of the long-distance wireless communication include schemes such as a fourth generation mobile communication system, a fifth generation mobile communication system, and dedicated short range communications (DSRC).

1.2 Output Unit 12

The output unit 12 includes a speaker that outputs audio and a display that outputs a video. That is, the output unit 12 outputs the video received from the sensor device 2. The video may be a moving image, a still image, or a graphic. The output unit 12 is controlled by the control unit 15, and output levels and muting of audio and video are adjusted. The display may also serve as the input unit 14 as long as it is a touch panel.

1.3 Position Information Acquisition Unit 13

The position information acquisition unit 13 detects at least position information. For example, the position information acquisition unit 13 acquires position information from a global navigation satellite system (GNSS). Note that the position information acquisition unit 13 may include an angular velocity sensor to improve detection accuracy of stop and start.

1.4 Input Unit 14

The input unit 14 is a camera, an operation panel, a microphone, or the like. Then, the input unit 14 receives audio, a video, and a user operation from the outside. The operation panel may also serve as a video display of the output unit 12 as long as it is a touch panel. The input unit 14 may be a steering switch installed on a steering wheel of a vehicle independently of the information processing apparatus 1. Furthermore, the input unit 14 may be a wearable device. In the case of a steering switch or a wearable device, the input unit 14 is connected to the information processing apparatus 1 in a wired or wireless manner.

1.5 Control Unit 15

The control unit 15 includes a CPU, a RAM, and a ROM, and executes an application. The application includes an analysis unit 151, a message unit 152, an output adjustment unit 153, an estimation unit 154, a navigation unit 155, a driving assist unit 156, and an interaction unit 157.

Furthermore, the control unit 15 controls the mode of the information processing apparatus 1. For example, the control unit 15 controls switching of a plurality of modes related to output control of the output unit 12. More specifically, the information processing apparatus 1 is set to a vehicle stop mode or a drive mode. The drive mode is set when the vehicle moves. The vehicle stop mode is set when the vehicle stops at home or the like. In the vehicle stop mode, the control unit 15 does not determine that the vehicle is moving even if the vehicle is moving. The control unit 15 may perform setting on the basis of an operation explicitly input to a user interface (UI) by the user, or may automatically determine that it is the drive mode in a case where the moving speed or the moving distance exceeds a threshold value. That is, the control unit 15 determines whether or not the vehicle is moving on the basis of the moving speed or the moving distance. Here, in a case where the information processing apparatus 1 is used at home or the like, the information processing apparatus 1 does not need to achieve both watching over an infant or the like and safe driving. Therefore, the mode switching is extremely effective. Furthermore, the control unit 15 performs output control of changing the output way by the output unit 12 and outputting the message information by the output unit 12 on the basis of the analysis result by the analysis unit 151.

1.5.1 Analysis Unit 151

On the basis of at least one of the video received from the information of the sensor device 2 and the change in the environmental information accompanying the movement of the vehicle, the analysis unit 151 analyzes information regarding a behavior sign that can affect the behavior of the passenger P. The behavior of the passenger P is, for example, behavior such as fussing, crying, or making noise of an infant. The behavior sign includes an event that can affect the behavior. For example, the behavior sign is a temperature change or a humidity change accompanying movement of the vehicle, sudden braking, an acceleration change accompanying sudden start, or the like. Furthermore, the analysis unit 151 may detect a behavior sign of the passenger P by image recognition or voice recognition. The information from the sensor device 2 obtained for detecting the behavior sign includes environmental information and vital information. The environmental information is information on the environment in which the passenger P is placed, such as temperature, illuminance, and vibration. The vital information is vital information of the passenger P such as brain waves and pulse waves.

Furthermore, the behavior of the passenger P may include a sleep sign, sleep, an awakening sign, and awakening. In this case, the analysis unit 151 detects a behavior sign of the passenger P by image recognition or voice recognition. For example, in the case of the image recognition, the analysis unit 151 detects an expression or a body motion of the passenger P as a behavior sign from an image captured by the sensor device 2. In the case of the voice recognition, the analysis unit 151 detects a sound such as a breathing sound, a snoring sound, or a rolling sound as a behavior sign from audio data acquired by the sensor device 2.

The analysis unit 151 detects a respiratory state and an apnea state of the passenger P by the voice recognition. In a case where the passenger P is sleeping quietly in the rear seat, the driver D does not know whether the passenger P is sleeping or apnea, and may feel stress. Therefore, it is also effective that the analysis unit 151 detects the apnea state of the passenger P as the behavior sign. The analysis unit 151 may detect the apnea state not only by the voice recognition but also by Wi-Fi (registered trademark), millimeter wave, or camera video. In particular, Wi-Fi (registered trademark) and millimeter waves are effective in being able to sense a shake of respiration.

Note that the analysis unit 151 is the application of the information processing apparatus 1, but may execute processing of the management device 3 on the cloud or processing in cooperation with the management device 3. In this case, the analysis unit 151 transmits information of the sensor device 2 to the management device 3 to cause the management device 3 to execute artificial intelligence (AI) processing and manned remote monitoring processing. The manned remote monitoring may be a volunteer based service formed by a social networking service (SNS) or the like, or a pay service that provides manned monitoring in foreign countries. For the infant on the rear seat, the former is a service provided by a nearby mamma who knows each other, and the latter is a service provided by a mamma from another country.

Note that the analysis unit 151 may detect a behavior sign of an infant or the like from the environmental information. It is difficult for an infant or toddler to acquire vital information because the infant or toddler does not like a sensor that comes into contact with the skin or the body movement is intense and it is easy to detect an error value. Therefore, the analysis unit 151 may detect a behavior sign from the environmental information, or may use the environmental information as information for interpolating an error value of the vital information. As a result, the analysis unit 151 can improve the accuracy of the behavior sign and suppress the cost since an advanced vital sensor technology is unnecessary.

Note that in a case where the vehicle is in the vehicle stop mode, that is, in a case where the vehicle is stopped, the environmental information does not change with the movement of the vehicle. Therefore, the analysis unit 151 detects the behavior sign based on the change in the vital information. Furthermore, the analysis unit 151 may detect the behavior sign using the environmental information on the assumption that the vehicle does not move.

Note that the analysis unit 151 can achieve both information compression and personal information protection by converting the information of the sensor device 2 into point cloud data or wire-framed data and transmitting the data to the management device 3.

1.5.2 Message Unit 152

The message unit 152 outputs message information to the output unit 12. The message information is a message, and may be audio, a character, or an image such as an icon. More specifically, the message unit 152 outputs, via the output unit 12, video information of the passenger P, a graphic related to the behavior sign of the passenger P, and audio related to the behavior sign of the passenger P. As a result, the message unit 152 alerts the driver D about the behavior of the passenger P. For example, in a case where the temperature rises, the message unit 152 outputs announcement audio of "temperature is rising", and superimposes a graphic indicating a behavior sign on the video information of the passenger P to output.

Furthermore, the message unit 152 may change a display mode of the video information by superimposing the graphic. The change of the display mode is not limited to the superimposition of the graphic, and may be any display mode as long as the display mode can be visually recognized. For example, the display mode may be changed by changing the video information to a monochrome video by filter processing. As described above, the message unit 152 calls driver D's attention to the behavior of the passenger P by changing the display mode of the video information.

Furthermore, the message unit 152 may also output "sleep sign", "sleep", "awakening sign", and "awakening" in an audio message or a graphic expression such as an icon that does not require gaze. Note that a long text or the like that needs to be read needs gaze of the driver D, and there is also a risk of inattentive driving, which is not appropriate as a message to be output while the vehicle is moving. However, all message expressions using text are not inappropriate, and may be text expressions that can be grasped without requiring gaze. For example, the message unit 152 may output a text of an iconic expression such as "attention!", "woke up!", or "asleep".

Furthermore, the message unit 152 may output a message that can clearly distinguish the urgency of the behavior sign of the passenger P. For example, the message unit 152 outputs a graphic message together with a warning sound in the case of "apnea" with high urgency, and outputs a graphic message in silence in the case of "sleep" with low urgency. This is because, in watching over the rear seat by the driver D, "apnea" is an undesirable behavior requiring an emergency response, and "sleep" is a preferable behavior.

1.5.3 Output Adjustment Unit 153

The output adjustment unit 153 restricts an output of the message generated by the message unit 152 by the output unit 12. For example, the output adjustment unit 153 restricts the output of the message by the output unit 12 on the basis of whether or not the vehicle is moving, whether or not the navigation audio is being output, and whether or not the safe driving assist audio is being output.

The purpose of the message output restriction is to prevent inattentive driving while driving rather than watching the rear seat, to prioritize navigation audio and driving assist audio, and to achieve both the rear seat watching and safe driving and comfortable driving. In other words, the output adjustment unit 153 controls the change of the output way by the output unit 12 on the basis of whether or not the vehicle is moving. Specifically, the output adjustment unit 153 controls the change of the output way by the output unit 12 on the basis of the drive mode or the vehicle stop mode.

FIGS. 5A to 5C and 6A to 6C illustrate output restrictions on video and audio performed depending on whether or not the vehicle is moving.

FIG. 5A illustrates an output of the information processing apparatus 1 while the vehicle is stopped. The output unit 12 superimposes and displays a behavior sign graphic G11, which is a graphic of the behavior sign generated by message unit 152, on the moving image of passenger P. For example, when the level of the behavior sign is 2 seconds or more and there is no update in a stationary state, the output adjustment unit 153 ends or lights the display of the behavior sign graphic G11 as a gaze prevention measure. The level of the behavior sign is, for example, the urgency of the behavior sign.

For example, as illustrated in FIGS. 5A and 5B, in a case where the behavior sign graphic G11 is an animation in which the graphic increases or decreases in the lateral direction according to the level of the behavior sign, the output adjustment unit 153 displays the behavior sign graphic G11 as a still image if there is no change in the level of the behavior sign. When this period exceeds 2 seconds, the output adjustment unit 153 stops the display of the behavior sign graphic G11 once and causes the behavior sign graphic G11 to be displayed again at short intervals. As a result, the output adjustment unit 153 can prevent the driver D from gazing at the information processing apparatus 1 and can support safe driving.

Furthermore, the output adjustment unit 153 causes the output unit 12 to output, for example, "temperature is rising" which is an audio message related to the behavior sign generated by the message unit 152. Note that the behavior sign graphic G11 in FIGS. 5A and 5B has a bar shape that changes stepwise according to the level of the behavior sign, but is not limited thereto, and may be a graphic superimposed in a frame shape on the edge of the image.

FIG. 5B illustrates an output of the information processing apparatus 1 while the vehicle is moving. The output adjustment unit 153 does not cause the output unit 12 to display a moving image of the passenger P in the rear seat, but causes the output unit 12 to output the behavior sign graphic G11 related to the behavior sign and audio. As a result, the output adjustment unit 153 achieves both prevention of inattentive driving while driving and calling attention to a behavior sign.

FIGS. 6A and 6B illustrate another example of switching between the moving image of the passenger P and the navigation image. FIG. 6A is an output when the vehicle is stopped, and a moving image of the passenger P is displayed. FIG. 6B illustrates an output when the vehicle is moving. The output adjustment unit 153 causes the output unit 12 to output such that the moving image of the passenger P and the navigation video are periodically switched. For example, the output adjustment unit 153 repeats processing of displaying the video of the rear seat for less than 2 seconds, displaying the navigation video for 15 seconds, and displaying the video of the rear seat for less than 2 seconds. Note that the output adjustment unit 153 causes the output unit 12 to output audio and graphics relating to the sign of behavior regardless of whether the vehicle is stopped or moving in a case where it is not a period in which the navigation video is displayed.

FIGS. 7A and 7B illustrate settings of output arbitration of the audio of the navigation device, the audio of the safety assist function, and the message audio of the information processing apparatus 1. In a case where the navigation audio is output, the output adjustment unit 153 mutes the audio output of the audio information included in the message information regarding the behavior sign of the information processing apparatus 1. The output adjustment unit 153 mutes the audio output of the audio information included in the message information regarding the behavior sign of the information processing apparatus 1 at least in a case where the audio of the driving assist regarding the start timing of the vehicle and the keeping of a lane is output. For example, in a case where the navigation audio or the safe driving assist audio is output, the output adjustment unit 153 postpones the message output of the audio related to the behavior sign of the information processing apparatus 1. The output adjustment unit 153 delays the video output when the safe driving assist audio is output, and outputs the video without delay when the navigation audio is output. As a result, the output adjustment unit 153 can preferentially notify the driver D of navigation audio such as "turn left" at the intersection, and safe driving assist audio for calling attention to wrong-way-driving and calling attention to delayed start. Note that, in the present embodiment, the state in which the display does not output the video and the state in which the speaker does not output the audio are not distinguished from each other, and are expressed as OFF or mute of the output.

1.5.4 Estimation Unit 154

The estimation unit 154 refers to a childcare history, an age in months, or an age in weeks of the passenger P, and estimates the behavior of the passenger P who is boarding. The estimation unit 154 estimates the behavior of the passenger who is boarding on the basis of the childcare history information 161 which is a childcare history of the passenger P recorded in the recording unit 16, and age in months and weeks information 162 indicating an age in months or an age in weeks. The childcare history information 161 includes at least a childcare history for a certain period of time before boarding. The certain period is a period in which a biorhythm can be detected, and is, for example, a unit of one week or one month.

Note that the estimation unit 154 is not limited to both the childcare history information 161 and the age in months and weeks information 162, and may estimate the behavior of the passenger while riding the vehicle on the basis of either one of them.

As illustrated in FIG. 10A, in the age in months and weeks information 162, the current age in months and age in weeks are calculated from the expected delivery date or the birthday set on the UI of the smartphone.

Furthermore, as illustrated in FIG. 10B, the childcare history information 161 is recorded by, for example, a diary type UI, and a state of an infant such as "sleeping", "awaking", or "fussing" and an action of baby care such as breast-feeding are recorded for each time. As the state record, for example, a stamp in which "awake", "sleeping", "happy mood", "fussing", "crying", and the like are preset is prepared, and the state record is displayed in a state record display field G21 when the user selects the stamp. The record of the baby care action such as a breast feeding stamp G221 indicating "breast feeding" and a diaper stamp G222 indicating "diaper" is similarly displayed in a baby care display field G22. Note that the state of the infant may be automatically determined by image recognition or an AI method.

The smartphone may be the same as or different from the information processing apparatus 1.

Information received from the user by the UI of the smartphone is uploaded to the management device 3 on the cloud. Then, the information processing apparatus 1 downloads from the management device 3 via the network.

The estimation unit 154 estimates the behavior of the passenger P while riding on the basis of the childcare history information 161 or the age in months and weeks information 162. For example, in a case where the current or scheduled time zone during driving is determined to be the "not sleeping" time zone from the child care history before boarding, the estimation unit 154 estimates that the passenger P "does not sleep" during driving. In a case where the time zone is determined to be "easy to fuss" on the basis of the meal interval and the excretion interval, the estimation unit 154 estimates that the passenger is "easily fussy".

FIG. 10C illustrates a presentation example of the estimation result on the smartphone UI. In the case of a behavior estimation display field G23 illustrated in this example, the passenger P is awake between 14:00 and 15:00 and is not in the time zone of "easy to fuss". Furthermore, the passenger P is less likely to cry or make noise during driving because it is a bedtime zone between 16:00 and 17:00. Therefore, the driver D can know that it is a time zone suitable for going-out drive.

The estimation unit 154 estimates the behavior of the passenger P using the age in months and weeks information 162 of the passenger P as a factor. There is a study (mental leap, etc.) that infants tend to fuss at a specific age in months or weeks. The cause is said to be rapid development of intelligence in the growth process. For this reason, the age in months or weeks is suitable as an element for estimating the behavior sign.

In a case where the age in months or the age in weeks is a period in which mental leap is likely to occur, the smartphone displays an M mark G24 meaning the period in the UI of FIG. 10C. The age in weeks at which mental leap is likely to occur is 5 weeks, 8 weeks, 12 weeks, 19 weeks, 26 weeks, 37 weeks, 46 weeks, 55 weeks, 64 weeks, and 75 weeks from the expected date of birth. In the present embodiment, as an example, the smartphone displays the M mark G24 at the above-described age in weeks.

As a result, the driver D can comprehensively determine whether or not it is a time zone suitable for driving, including not only the child care history but also whether or not it is the mental leap period.

For example, in a case where the estimation result based on the childcare history indicates that it is a time zone suitable for driving, but the estimation result based on the mental leap period indicates that it is a period in which the passenger P is likely to fuss, the driver D can make a drive plan such as selecting a road having many commercial facilities having a parking lot where temporary stop is likely to be made.

1.5.5 Navigation Unit 155

Drive Plan

The navigation unit 155 presents the drive plan to the user on the basis of an estimation result of the estimation unit 154.

FIGS. 8A and 8B illustrate presentation of the estimation result on the smartphone UI. As illustrated in FIG. 8A, the navigation unit 155 presents a recommended time zone and a caution-needed time zone via the smartphone UI. Furthermore, the navigation unit 155 also refers to the mental leap period based on the age in months or the age in weeks, and presents evaluation as to whether or not it is suitable for going-out drive. The present embodiment presents the evaluation by the number of stars as an example.

Note that the smartphone that presents the UI of the navigation unit 155 may be shared with the information processing apparatus 1 or may be another apparatus. In the case of another apparatus, the smartphone performs data consistency via the cloud.

Going-Out Navigation

The navigation unit 155 refers to the estimation result of the estimation unit 154 and proposes a drive route as illustrated in FIG. 8B. Furthermore, the navigation unit 155 may perform navigation for guiding parking on the basis of an analysis result of the behavior sign of the analysis unit 151. That is, the control unit 15 may cause the navigation unit 155 to perform navigation for guiding parking on the basis of the analysis result of the behavior sign of the analysis unit 151. More specifically, the navigation unit 155 searches for the drive route based on at least the destination, the scheduled riding time, and an estimation result of the behavior of the passenger P estimated by the estimation unit 154. Then, the navigation unit 155 proposes a drive route. The navigation unit 155 is an example of a route search unit.

In the case of the example of FIG. 8B, the navigation unit 155 proposes traveling in the section 1 in the time zone in which the passenger P is awake, proposes to stop at a nurse facility where diaper replacement or feeding is possible such as a convenience store in the next time zone in which the passenger P starts to fuss, and proposes traveling in the section 2 in the time zone in which the passenger P is estimated to sleep.

In the route, a degree of safety is set based on a statistical accident history, a traffic volume, a road width, and the like. Then, the navigation unit 155 selects the section 2 having higher safety than the section 1, thereby performing route selection in consideration of the sleep of the passenger P.

For example, the navigation unit 155 selects a route on which the passenger P can run quietly and safely in a case where it is estimated that the passenger P sleeps, selects a route focusing on efficiency such as speed in a case where it is estimated that the passenger P rises, and selects a route on which an emergency stop is easily performed in a case where it is estimated that the passenger P is in a bad mood. Navigation As illustrated in FIG. 6B, the navigation unit 155 alternately presents navigation of a route and video information of the passenger P while riding.

As illustrated in FIG. 7A, the output adjustment unit 153 performs control to prioritize navigation audio over an output of a behavior sign.

Emergency Stop Navigation

The navigation unit 155 proposes navigation for an emergency stop and executes the emergency stop. The navigation unit 155 makes a suggestion when the analysis unit 151 detects a behavior sign. FIGS. 9A to 9C illustrate an example of presentation on the smartphone UI. FIG. 9A is a UI indicating a behavior sign, and FIG. 9C is a UI indicating navigation for an emergency stop. For example, the navigation unit 155 performs audio navigation to the nearest parking lot on the drive route. Note that the navigation unit 155 may propose a route deviated from the initial drive route. In this case, the navigation unit 155 may present "The drive route deviates from the planned drive route." or the like. Furthermore, the navigation unit 155 may present an assumed arrival time, for example, "It takes about 3 minutes to get to the parking lot". With such presentation, the driver D can prepare in advance measures in case of an emergency, which is effective in reducing the stress of going-out drive with the infant.

1.5.6 Driving Assist Unit 156

The driving assist unit 156 assists the driving of the driver D on the basis of intersection information or traffic signal information acquired from ITS or a camera. The driving assist unit 156 outputs an announcement of a warning, for example, in a case where a vehicle is greatly delayed from a departure timing of a preceding vehicle when the vehicle stops at an intersection, or in a case where the vehicle is greatly deviated to the left and right from the center of the traveling lane during movement. The warning announcement is, for example, "the vehicle in front has started", "the lane is biased to the left", or the like.

As illustrated in FIG. 7B, the output adjustment unit 153 performs control to prioritize the driving assist audio over the output of the behavior sign. Note that, in a case where the driving assist audio is output, the output adjustment unit 153 may mute the video output of all the behavior signs of the information processing apparatus 1. Muting the video output is effective for calling attention such as start delay. Note that the driving assist unit 156 may be provided separately from the information processing apparatus 1, and may be provided in a form of interlocking output arbitration of audio with the information processing apparatus 1.

1.5.7 Interaction Unit 157

The interaction unit 157 controls interaction between the driver D and the passenger P on the rear seat. That is, in the interaction unit 157, the in-vehicle user performs interactive processing with a device of the out-of-vehicle user. For example, after outputting a message of the behavior sign, the interaction unit 157 outputs the voice of the driver D and a driver video G28 from an output unit 25 of the sensor device 2.

Furthermore, the interaction unit 157 outputs music and a video from the output unit 25 of the sensor device 2 according to an instruction of the driver D. For example, the music is a lullaby or a rhythm sound that is played when a child fusses. The video is a favorite animation or the like.

Furthermore, the interaction unit 157 may perform remote monitoring processing by an out-of-vehicle user via the management device 3 on the cloud. The interaction unit 157 performs interactive processing between the out-of-vehicle user and the in-vehicle user in a case where a behavior sign message is output to the out-of-vehicle user. For example, the interaction unit 157 outputs a voice to the driver D or a voice to soothe the passenger P on the rear seat. For example, the interaction unit 157 outputs audio such as "The baby is going to cry, it is better to park." to the driver D, and outputs audio such as "Hi, how are you?" to the passenger P on the rear seat.

Furthermore, for example, the out-of-vehicle user may be a registered spouse or a family member such as grandparents, and may be a volunteer registered on the SNS. In this case, the interaction unit 157 notifies the person concerned of the message of the behavior sign by SNS, and sets the video call between the person concerned who has responded and the sensor device 2 in the management device 3.

As a result, the interaction unit 157 can cause the driver D to perform a coaxing behavior when the behavior sign appears, and can cause the driver D to perform a behavior avoidance activity such as big cry. Then, in a case where the avoidance activity is not successful, the driver D performs the emergency stop navigation of the navigation unit 155 described above.

1.6 Recording Unit 16

The recording unit 16 records the childcare history information 161, the age in months and weeks information 162, the remote user information 163, and the notification information 164.

FIGS. 10A to 10D illustrate setting and display of the childcare history information 161 and the age in months and weeks information 162 on the smartphone UI.

In addition to the age in months and weeks, the age in months and weeks information 162 may include the gender and the country of residence which can be an element for statistically estimating the mental leap period.

As illustrated in FIG. 10D, the childcare history information 161 includes a childcare history during boarding in addition to a childcare history before boarding.

The childcare history information 161 includes an estimation result of an emotion of the infant who is the passenger P, a memo, a video of the infant who is the passenger P, a video of the driver D, music reproduced while riding, and a drive route as memorial information of riding. Then, the smartphone may display the emotion estimation result displayed in the emotion estimation display field G25, a memo image G26 which is an image of a memo, a passenger P video G27 which is a video of an infant, a driver video G28 which is a video of the driver D, and a memorial image G29 which is an image of music played while riding or a drive route.

The childcare history information 161 is uploaded to the management device 3 on a cloud via a network.

As a result, the driver D can manage the childcare record of the infant on board and the childcare record before boarding together. Furthermore, since the memorial information is recorded as memories of the drive, the driver D can be motivated to enjoy the going-out drive.

As a result, when the child grows and looks back on his/her growth track, the driver D can enjoy the state during driving and the childcare history in which the memorial information is left.

The remote user information 163 includes access information to a device of a user who remotely monitors the inside of the vehicle from the outside of the vehicle. For example, the access information is a telephone number used in the IP phone.

The notification information 164 includes sign information and a status. The sign information is information indicating a behavior sign of the passenger P. The sign information is updated with the analysis result of the analysis unit 151. The notification information 164 corresponds to the sign information and has information for designating icons of sunny, cloudy, and lightning.

The status is information indicating a state of the vehicle. The status is updated by the control unit 15 along with the movement information of the vehicle. The status includes at least whether the vehicle is moving, a speed of the vehicle, a type of a road on which the vehicle is traveling, a distance from an out-of-vehicle system 700 to an in-vehicle system 600, and movement time information. For example, the road type includes a highway, a general road, and a tunnel road. For example, the movement time information is obtained from the average speed of the vehicle.

2. Sensor Device 2

FIG. 2 illustrates a functional configuration of the sensor device 2. The sensor device 2 includes a camera unit 21, a microphone unit 22, a detection unit 23, and a transmission unit 24.

The camera unit 21 captures an image of the passenger P. Note that the camera unit 21 may detect a body temperature state from the detected infrared rays or the like.

The microphone unit 22 collects audio of the passenger P. The sound includes environmental audio such as noise, a breathing sound, a breathing sound, and a body motion sound of the passenger P in addition to a sound generated by the passenger P. The microphone unit 22 may be a directional microphone. In this case, the microphone unit 22 can efficiently collect sound related to the passenger P.

The detection unit 23 is various sensors. For example, the detection unit 23 is a temperature sensor, a humidity sensor, an odor sensor, a vital sensor, an angular velocity sensor, a weight sensor, or a non-contact vibration sensor for detecting respiration.

The temperature sensor is suitable for detecting a temperature change in the environment of the vehicle interior in which the passenger P is present. Furthermore, the temperature sensor is also suitable for detecting an unpleasant temperature change or detecting a temperature change that may affect the maintenance of life in a case where the user is left in the vehicle interior with the air conditioner turned off.

The humidity/odor sensor is suitable for detecting excretion of the passenger P.

The vital sensor is suitable for detecting heart rate, body temperature, brain waves, and the like, and detecting early sleepiness and sleepiness.

The angular velocity sensor is suitable for detecting information in which vehicle movement such as sudden start or sudden braking affects the behavior of the passenger P.

The weight sensor is suitable for determining falling off of the infant from the baby seat from the position of the center of gravity.

The non-contact vibration sensor for respiration detection counts the respiration rate by detecting vibration with microwaves and millimeter waves.

Note that the sensor device 2 may include a speaker or a display. In this case, the sensor device 2 may output video and audio information from the information processing apparatus 1. As a result, the sensor device 2 can present a video and audio information regarding the driver D to the passenger P. Therefore, the sensor device 2 can be expected to have an effect of interactively entertaining the infant, who is the passenger P, such as talking when the infant starts to fuss.

Processing Operation of Control System

A processing operation of the control system of the system 500 configured as described above will be described below.

Figure 3:
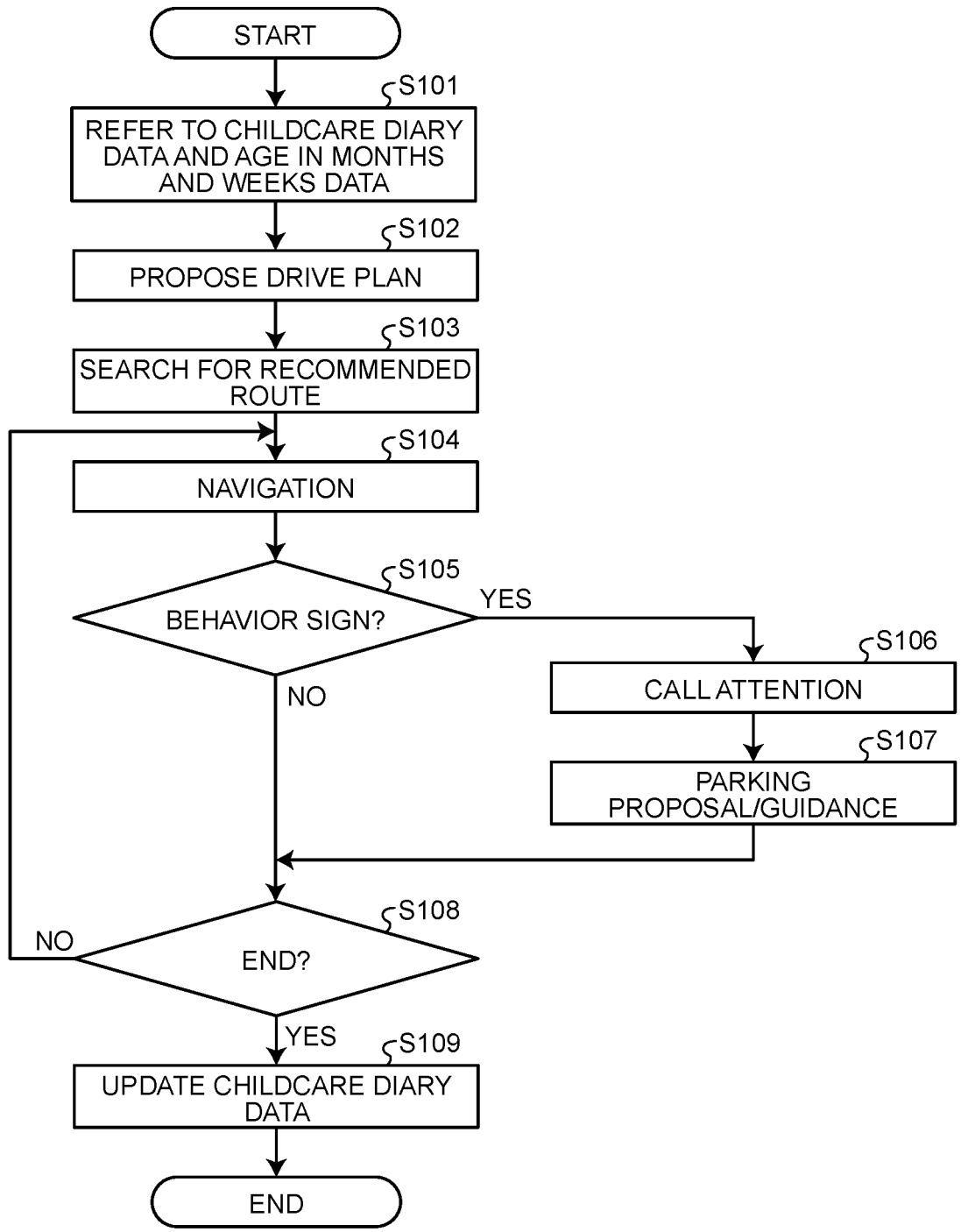
FIG. 3 is a flowchart of information processing in the first embodiment.

FIG. 3 is a flowchart of a control system of system 500 according to the first embodiment. Hereinafter, information processing of the control system will be described with reference to FIG. 3. Information processing of the control system is performed by the control unit 15. The user's customer journey starts from inside the house before getting in the car. The information processing apparatus 1 is detached from a car and disposed in a house, and records a childcare diary in the house as needed. An example of the childcare diary is illustrated in FIGS. 10A to 10D.

When activated, the information processing apparatus 1 refers to the childcare diary data and the age in months and weeks data (S101). The childcare diary data and the age in months data are recorded in the recording unit 16 as the childcare history information 161 and the age in months and weeks information 162. Note that the information processing apparatus 1 may update the childcare diary data and the age in months and weeks data by acquiring the latest childcare history information 161 and age in months and weeks information 162 from the management device 3 on the cloud via the network.

In response to the user request, the information processing apparatus 1 estimates the behavior of the passenger P who is in the vehicle on the day by referring to the acquired childcare diary data and the age in months and weeks data, and proposes a drive plan (S102). The estimation is performed by the estimation unit 154, and the suggestion is performed by the navigation unit 155 of the control unit 15.

FIG. 8A illustrates an example of a proposed drive plan. The recommended time zone of the day, the caution-needed time zone, and the overall evaluation are presented with the number of stars. It is possible to use a material for determining whether or not the user goes out for a drive and a time zone when the user goes out.

In response to the user request, the information processing apparatus 1 searches for a recommended drive route and proposes the recommended drive route (S103).

FIG. 8B illustrates an example of a proposed drive path. In the customer journey, the user moves from the house to the car together with the infant who is the passenger P and gets on the car. The information processing apparatus 1 is carried from a house by hand and attached to a vehicle. As illustrated in FIG. 1, the passenger P sits on a baby chair at a rear seat, and a seat is set. The sensor device 2 detects the passenger P. Furthermore, the information processing apparatus 1 also displays a video image of passenger P on the rear seat.

The information processing apparatus 1 starts navigation based on the drive route selected in response to the user request (S104). The navigation is performed by the navigation unit 155.

The information processing apparatus 1 analyzes the presence or absence of a behavior sign on the basis of the detected environmental information (S105). The analysis is performed by the analysis unit 151.

The behavior sign based on the change in the environmental information is, for example, a temperature change, a humidity change, a sudden braking, or an acceleration change accompanying a sudden start. The behavior of the passenger P as a target of the behavior sign is, for example, the behavior of the infant such as fussing, crying, or noisy.

Note that the behavior of the passenger P includes a preferable behavior and an undesirable behavior for the user. The undesirable behavior is the above-mentioned fussing, crying, and noisy of infants. A preferable behavior is sleeping, and in this case, waking up is an undesirable behavior. These behavior signs are performed by detecting the bio-information of the passenger P.

If there is a behavior sign, the information processing apparatus 1 calls attention (S106). The call attention is performed by the message unit 152, and the output unit 12 outputs a message by a video or audio.

Examples of the call attention using the detection of the environmental information include "the temperature of the rear seat is rising", "the humidity of the rear seat is increasing", and "rapid acceleration and rapid deceleration are detected at rear seat".

Examples of the call attention using the detection of the bio-information include "asleep" and "about to wake up".

The information processing apparatus 1 makes a parking proposal, and performs parking guidance navigation if there is a user request for parking (S107). The parking proposal and the parking guidance are performed by the navigation unit 155.

The information processing apparatus 1 performs end determination (S108). Furthermore, the information processing apparatus 1 updates the childcare diary data in the case of termination (S109). In a case where the process is not terminated, the information processing apparatus 1 performs navigation in S107.

In the customer journey, the user gets off the car and moves with the passenger P to a destination or a house.

Processing Operation of Output System

A processing operation of the output system of the system 500 will be described below.

Figure 4:
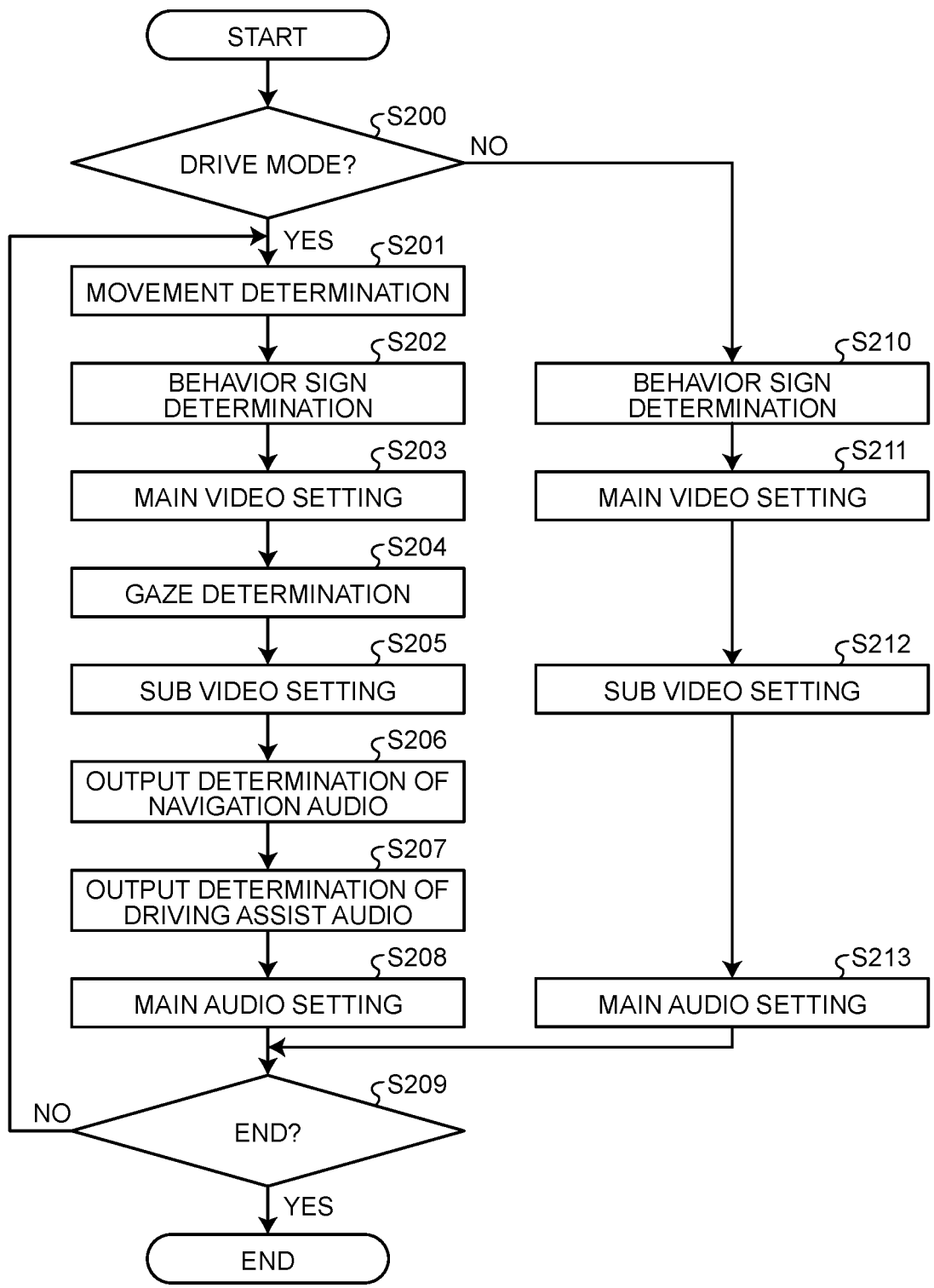
FIG. 4 is a flowchart of output control in the first embodiment.

FIG. 4 is a flowchart of an output system of system 500 according to the first embodiment. The output adjustment unit 153 of the information processing apparatus 1 performs output control on the output unit 12.

The control unit 15 of the information processing apparatus 1 determines whether it is the drive mode or the vehicle stop mode (S200). In the vehicle stop mode, the information processing apparatus 1 does not need to achieve both watching and safe driving. That is, in the vehicle stop mode, the information processing apparatus 1 does not execute the movement determination in S201, the gaze determination in S204, the navigation audio output determination in S206, and the driving assist audio output determination in S207. Then, the information processing apparatus 1 performs main video setting (S211), sub video setting (S212), and main audio setting (S213) on the basis of the determination result of the behavior sign executed in S210.

Note that the control unit 15 of the information processing apparatus 1 may determine that the vehicle is stopped regardless of whether or not the vehicle is moving in the vehicle stop mode. Furthermore, in the vehicle stop mode, the information processing apparatus 1 may determine that the vehicle is stopped without performing movement determination for determining whether the vehicle is moving. Similarly, in the vehicle stop mode, the information processing apparatus 1 may perform gaze determination and determine that the display is always less than 2 seconds. Similarly, in the case of the vehicle stop mode, the information processing apparatus 1 may always determine that the output is non-output regardless of the determination result of the driving assist audio output determination.

The information processing apparatus 1 performs movement determination as to whether the vehicle is stopped (S201). More specifically, the control unit 15 performs the movement determination based on the output of the vehicle position information of the position information acquisition unit 13 and the output of the acceleration sensor provided side by side with the position information acquisition unit 13. The control unit 15 determines that the vehicle is stopped if there is no change in the position information for a certain period of time such as 5 seconds. Note that the control unit 15 may perform stop determination by an artificial intelligence (AI) method in which the position information and the output of the acceleration sensor are learned by a support vector machine (SVM) or the like. In this case, the control unit 15 can make a stop determination in a short time.

The information processing apparatus 1 performs behavior sign determination for detecting a behavior sign (S202). The behavior sign determination is performed by the analysis unit 151.

The information processing apparatus 1 performs main video setting (S203). The output adjustment unit 153 of the control unit 15 performs the main video setting based on the result of the movement determination in S201 and the result of the behavior sign determination in S202.

Note that, in the case of the vehicle stop mode, the output adjustment unit 153 of the control unit 15 performs the main video setting on the basis of the determination result of "there is no movement" (S211). FIG. 5C illustrates ON/OFF setting of the main video and the sub video according to the present embodiment. As illustrated in FIG. 5C, the main video that outputs passenger P on the rear seat is displayed only while the vehicle is stopped. Note that, in a case where there is a behavior sign, the sub video is output independently of the presence or absence of movement.

In the case of the main video, there is a problem that the driver D can see the video and the distracted driving is likely to occur. In a case where the vehicle is moving, the information processing apparatus 1 can achieve both safe driving and watching over the rear seat by turning off the main video and watching over the rear seat with the sub video. The information processing apparatus 1 performs gaze determination (S204). For example, the information processing apparatus 1 performs gaze determination depending on whether the sub video is displayed in a still image state for more than 2 seconds. That is, in the drive mode, the control unit 15 restricts output of an image that does not move for more than a predetermined period of time.

The information processing apparatus 1 performs sub video setting (S205). As illustrated in FIG. 5C, in a case where there is a behavior sign, the information processing apparatus 1 outputs the sub video independently of the presence or absence of movement. However, in a case where the gaze determination is made as the exceptional process, the information processing apparatus 1 stops the output of the sub video or performs the blinking process within a range not exceeding 2 seconds.

Note that, in the case of the vehicle stop mode, the information processing apparatus 1 performs the sub video setting on the basis of the determination result that "there is no gaze" (S212).

The information processing apparatus 1 performs output determination of the navigation audio (S206).

The information processing apparatus 1 performs output determination of the driving assist audio (S207).

The information processing apparatus 1 performs main audio setting (S208). The information processing apparatus 1 sets the main audio on the basis of the determination result of the behavior sign determination in S202. As illustrated in FIG. 5C, if there is a behavior sign, the information processing apparatus 1 outputs audio related to the behavior sign. The information processing apparatus 1 performs the output adjustment on the basis of the output determination of the navigation audio and the output determination of the driving assist audio. As illustrated in FIGS. 7A and 7B, the information processing apparatus 1 gives priority to the output of the navigation audio and the driving assist audio.

Note that the information processing apparatus 1 may or may not perform output adjustment of the navigation audio and the driving assist audio. Furthermore, the information processing apparatus 1 may output both the navigation audio and the driving assist audio.

Note that, in the case of the vehicle stop mode, the output adjustment unit 153 of the control unit 15 performs the main video setting on the basis of the output determination of the driving assist audio (S212).

The information processing apparatus 1 determines whether or not to end the processing of the output system (S209). In a case where the process is not terminated, the information processing apparatus 1 returns to S201. In a case where the process does not return to S201, the information processing apparatus 1 ends the process.

Processing Operation of Interactive Processing

Hereinafter, the interactive processing of in-vehicle and out-vehicle users using an in-vehicle system 600 and an out-of-vehicle system 700 will be described with reference to FIGS. 11, 12, 13, and 14.

Figure 11:
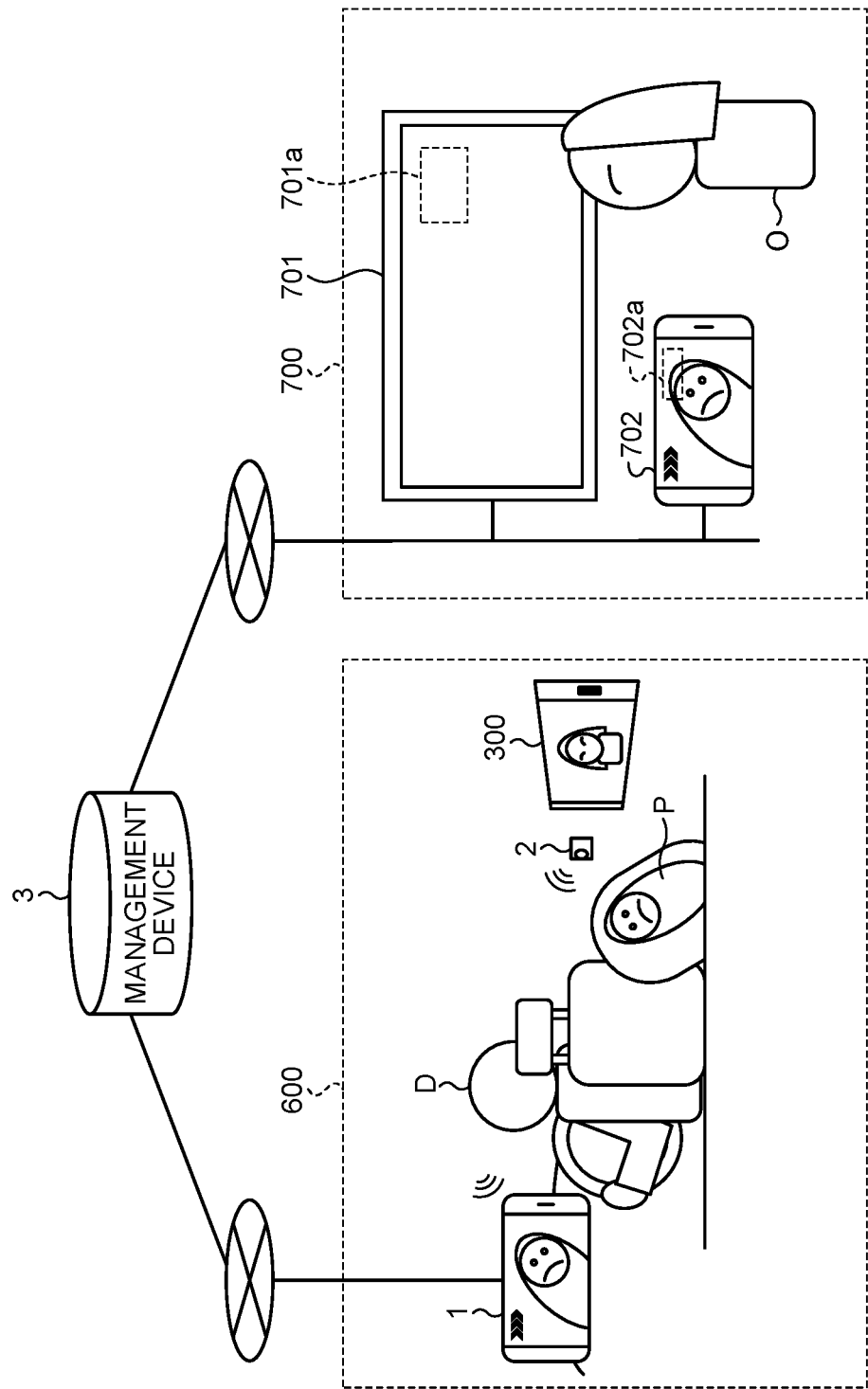
FIG. 11 is an explanatory diagram for explaining an outline of the system in the first embodiment.

FIG. 11 is an explanatory diagram illustrating an outline of a system according to the first embodiment of the present invention. The same reference signs are given to the same configurations as those in FIG. 1, and the description thereof will be omitted.

In FIG. 11, the in-vehicle system 600 is provided inside a cabin, and the out-of-vehicle system 700 is provided outside the cabin.

The in-vehicle system 600 includes the information processing apparatus 1 of a driver D and an information processing apparatus 300 of a passenger P in the rear seat, and performs interactive processing with an out-of-vehicle user O using audio and a video. The interactive processing includes a voice from the out-of-vehicle user O. The talking is, for example, to notify the driver D of the state of the passenger P in the rear seat, to warn the driver D of a behavior sign, or to advise the driver D of temporary parking.

The video of the passenger P in the rear seat and the notification information 164 are transmitted to the out-of-vehicle system 700 via the management device 3, which is a cloud, and the network. A transmission destination is recorded in the recording unit 16 as the remote user information 163.

For example, the out-of-vehicle system 700 is a home. The out-of-vehicle system 700 is connected to a display device 701 and an information processing apparatus 702 via a network. The display device 701 is connected to a Wi-Fi (registered trademark) communication device via a universal serial bus (USB) terminal. Then, the display device 701 communicates with a device of the in-vehicle system 600 via a network. For example, the information processing apparatus 702 is a smartphone. The information processing apparatus 702 communicates with a device of the in-vehicle system 600 via a network.

When receiving the video information and the like from the in-vehicle system 600, the information processing apparatus 702 distributes the video information and the like to the display device 701 via the network.

The display device 701 displays the notification information 164 from the in-vehicle system 600 in a notification information display area 701a. Furthermore, the information processing apparatus 702 displays the notification information 164 from the in-vehicle system 600 in a notification information display area 702a.

The notification information 164 includes sign information and a status. That is, the display device 701 displays the sign information and the status in the notification information display area 701a. The information processing apparatus 702 displays the sign information and the status in the notification information display area 702a. For example, the display device 701 and the information processing apparatus 702 display icons indicating the sign information. For example, the display device 701 and the information processing apparatus 702 display a sunny icon when there is no behavior sign for the passenger P in the rear seat who is the watching target, a cloudy icon when there is a behavior sign, and a rainy icon when a behavior sign is estimated.

For example, the analysis unit 151 manages the temperature in the vehicle interior in a range such as every 2 degrees centering on 25 degrees. The analysis unit 151 determines that a sign of a behavior sign is present when the measured temperature shifts by 1 range. Furthermore, the analysis unit 151 determines that a movement of 2 ranges is a sign of behavior. Note that the analysis unit 151 may determine the behavior sign not only by the temperature in the vehicle interior but also by another method. For example, the analysis unit 151 measures the number of times of sudden braking and sudden acceleration per unit time. Then, the analysis unit 151 may determine the behavior sign on the basis of the number of times.

The status includes at least whether or not the vehicle is moving, a speed of the vehicle, a type of a road on which the vehicle is traveling, a distance from the out-of-vehicle system 700 to the in-vehicle system 600, and movement time information. Examples of the road type include a highway, a general road, and a tunnel road. The movement time information is obtained from the average speed of the vehicle.

An interaction application is installed in the information processing apparatus 702 of the out-of-vehicle user. Then, when instructed by the out-of-vehicle user, the information processing apparatus 702 starts interactive processing with the interaction unit 157 of the information processing apparatus 1 via the management device 3, which is a cloud, and the network.

The information processing apparatus 702 of the out-of-vehicle user distributes the acquired video information and the like to the information processing apparatus 1. Then, the information processing apparatus 1 distributes the video information and the like to the information processing apparatus 300 of the passenger P in the rear seat. The information processing apparatus 1 displays either the watching video of the passenger P in the rear seat or the video of the information processing apparatus 702 of the out-of-vehicle user on the basis of the video information or the like, or displays the watching video or the video divided into two. Furthermore, the information processing apparatus 300 of the passenger P in the rear seat displays any one of the video acquired by the information processing apparatus 1 of the driver D and the information processing apparatus 702 of the out-of-vehicle user O or the two on the basis of the video information and the like.

For example, as illustrated in FIG. 11, the information processing apparatus 1 displays a watching video of the rear seat, and the information processing apparatus 300 displays a video acquired by the information processing apparatus 702 of the out-of-vehicle user O.

Figure 14A:
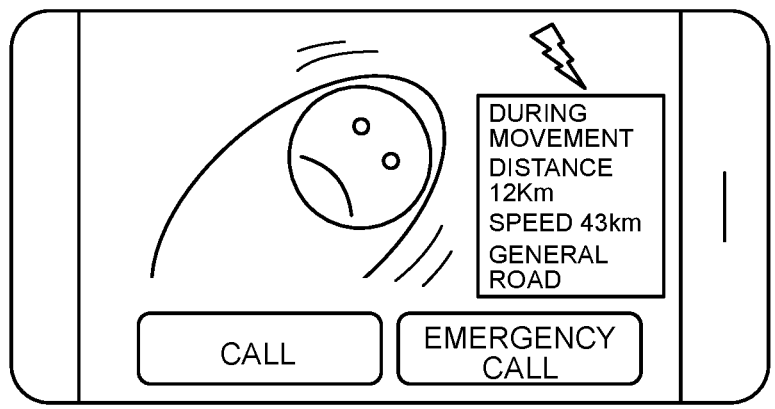
FIGS. 14A and 14B are explanatory diagrams of transition between a main video and incoming call confirmation in the first embodiment.
Figure 14B:
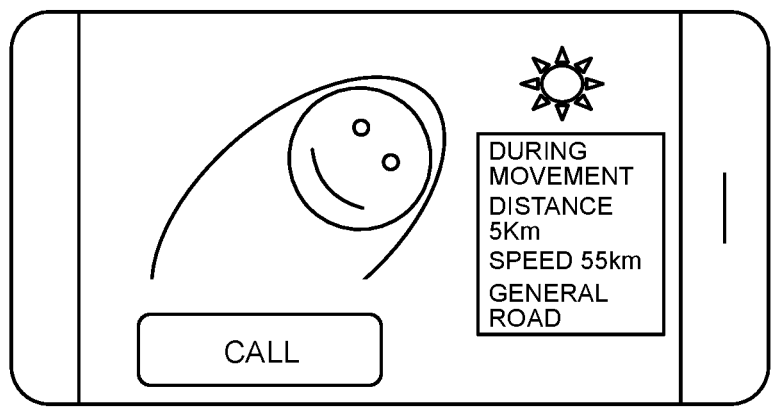

As illustrated in FIGS. 14A and 14B, the interactive processing of the interaction unit 157 includes at least a normal mode and an emergency mode. In the interactive processing, the out-of-vehicle user can select the normal mode and the emergency mode when starting the interaction. The normal mode is a mode in which the interactive processing is started when an operation of permitting an incoming call is accepted by the in-vehicle user. The incoming call permission is performed by an instruction on a voice recognition user interface or a switch button attached to a steering wheel. The emergency mode is a mode in which the interactive processing with the out-of-vehicle user is started even if the operation of permitting the incoming call is not received by the in-vehicle user. Then, the interaction unit 157 permits the emergency mode on the basis of an analysis result or the like of the behavior sign of the analysis unit 151.

As illustrated in FIG. 12C, the interaction unit 157 notifies the display device 701 and the information processing apparatus 702, which are the devices of the out-of-vehicle user O, of the analysis result of the behavior sign of the analysis unit 151 and the presence or absence of movement of the vehicle. For example, the information processing apparatus 1 controls ON and OFF of the incoming call confirmation on the basis of whether or not the vehicle is moving and the presence or absence of a behavior sign of the passenger P in the rear seat. For example, in a case where there is a behavior sign, the information processing apparatus 1 turns off the incoming call confirmation regardless of whether the vehicle is stopped or moving, and starts the interactive processing in the emergency call.

FIGS. 12A and 12B illustrate the video of the passenger P in the rear seat, the sub video, and ON/OFF control of the incoming call confirmation function of the interactive processing from the out-of-vehicle user in the information processing apparatus 1 on a side of the driver D.

The information processing apparatus 1 controls ON/OFF of the incoming call confirmation function based on whether or not the vehicle is moving and whether or not there is a behavior sign.

As illustrated in FIGS. 12A and 12B, if there is a behavior sign, the information processing apparatus 1 turns off the incoming call confirmation regardless of whether or not the user is moving, and starts the emergency call from the out-of-vehicle user O. On the other hand, if during movement, the information processing apparatus 1 turns off the main video regardless of the presence or absence of the behavior sign to achieve both safe driving and watching over the rear seat. In the case of moving, the out-of-vehicle user O can watch from a remote place and speak to the driver D as needed based on the sign information and the status displayed in the notification information display areas 701a and 702a, and the driver D can concentrate on safe driving.

Figure 13:
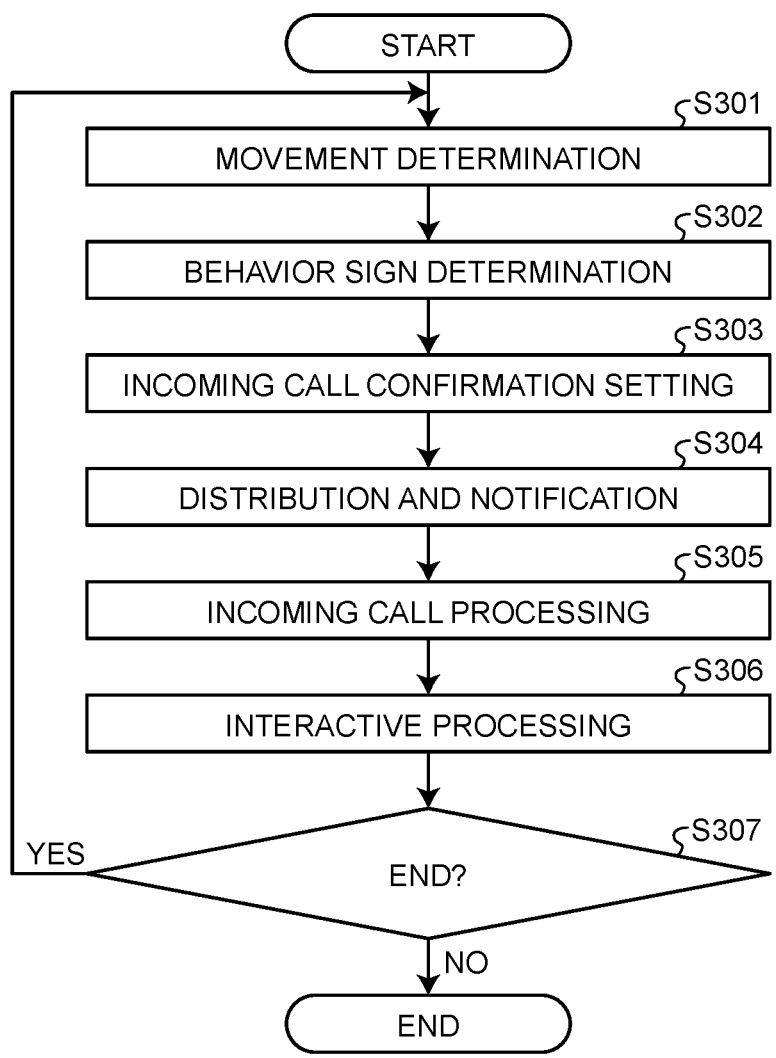
FIG. 13 is a flowchart of information processing in the first embodiment.

FIG. 13 is a flowchart of ON/OFF control of incoming call confirmation.

The information processing apparatus 1 performs movement determination (S301). The control unit 15 performs movement determination on the basis of an output of vehicle position information of the position information acquisition unit 13 and an output of an acceleration sensor provided side by side with the position information acquisition unit 13. The control unit 15 determines that the vehicle is stopped if there is no change in the position information for a certain period of time, for example, 5 seconds. Note that the control unit 15 may perform stop determination by an AI method in which the position information and the output of the acceleration sensor are learned by the SVM or the like. In this case, the control unit 15 can make a stop determination in a short time.

The analysis unit 151 of the information processing apparatus 1 performs behavior sign determination (S302).

The information processing apparatus 1 performs incoming call confirmation setting (S303). The interaction unit 157 of the control unit 15 performs incoming call confirmation setting on the basis of the behavior sign determination result. The interaction unit 157 enables both the emergency mode in which the incoming call confirmation is not performed and the normal mode in which the incoming call confirmation is performed in response to the interaction request from the outside of the vehicle interior when at least the behavior sign is present. If there is no behavior sign, the interaction unit 157 enables only a normal call.

The information processing apparatus 1 performs distribution and notification (S304). The interaction unit 157 delivers the video of the watching target of the rear seat acquired by the information processing apparatus 1 from the sensor device 2 to the access destination indicated by the remote user information 163 of the recording unit 16 in a push type. The video to be distributed may or may not include audio. In a case where the sound is included, the interaction unit 157 may suppress the level of noise such as loading noise of the vehicle, noise, or music of a car audio by acoustic processing, and distribute the sound from which these noises have been removed. The control unit 15 notifies the access destination indicated by the remote user information 163 of the recording unit 16 of the notification information 164 of the recording unit 16. Note that the information processing apparatus 1 performs distribution and notification to the information processing apparatus 702 in a push manner, and does not need to start a dialog.

The information processing apparatus 1 performs incoming call processing of the out-of-vehicle user from the information processing apparatus 702 (S305). The interaction unit 157 performs incoming call processing on the basis of the setting of incoming call confirmation. The interaction unit 157 performs the incoming call confirmation when the incoming call is in the normal mode, and starts the interaction without performing the incoming call confirmation when the incoming call is in the emergency mode.

The interaction unit 157 of the information processing apparatus 1 performs interactive processing (S306). Here, the interactive processing is bidirectional communication and means a video call between the information processing apparatus 1 and the information processing apparatus 702. Note that the interaction unit 157 does not perform ON/OFF control of the incoming call confirmation in a case where the mode is not the drive mode but the vehicle stop mode.

According to the present embodiment, attention can be attracted by sensing a behavior sign of the passenger P and providing the behavior sign to the driver D. As a result, the driver D is relieved from the stress that cannot predict the behavior of the passenger P at all, can concentrate on driving, and can enjoy going out. In particular, the present invention is suitable for watching over an infant sitting on a rear seat baby chair that is difficult to visually recognize even when looking back.

Furthermore, according to the present disclosure, the output way can be changed depending on whether or not the vehicle is moving, and the output way in which the driver D who is driving is more likely to concentrate on driving than when the vehicle is stopped can be provided. As a result, both the watching over of the passenger P and the safe driving can be achieved.

According to the present disclosure, the information processing apparatus can raise attention by sensing a behavior sign of a passenger and providing the sign to the driver. As a result, the driver can be relieved from the stress that cannot predict the behavior of the passenger at all, can concentrate on driving, and can enjoy going out. In particular, the information processing apparatus is suitable for watching over an infant sitting on a baby chair in a rear seat facing the rear of the vehicle, which is difficult to visually recognize even when looking back.

Furthermore, according to the present disclosure, the information processing apparatus can change the output way depending on whether or not the vehicle is moving, and can provide the output way in which a driver who is driving can concentrate on driving more easily than when the vehicle is stopped. As a result, the information processing apparatus can achieve both watching over the passenger and safe driving.

Furthermore, according to the present disclosure, the information processing apparatus can reduce a processing load in the vehicle stop mode indicating that the vehicle is stopped.

Furthermore, according to the present disclosure, the information processing apparatus can prevent the driver from gazing at an image for more than a predetermined period of time while the vehicle is moving.

Furthermore, according to the present disclosure, the information processing apparatus can prioritize navigation audio, and can achieve both watching over the passenger and comfortable driving.

Furthermore, according to the present disclosure, the information processing apparatus can prioritize the driving assist audio, and can achieve both watching over the passenger and safe driving. In particular, the information processing apparatus is suitable for preventing going-out start delay during a temporary stop due to a signal or the like.

Furthermore, according to the present disclosure, the information processing apparatus can promptly guide the driver to park or stop the vehicle on the basis of the analysis result of the behavior sign. Therefore, the information processing apparatus can provide the driver with preparation for an emergency, and is suitable for reducing driver's stress and enjoying going-out drive.

Furthermore, according to the present disclosure, the information processing apparatus can estimate a behavior sign of the passenger also based on a childcare history of the passenger before boarding. The meal, excretion, and sleep of the passenger have periodicity, and are suitable as elements for estimating the behavior sign.

Furthermore, according to the present disclosure, the information processing apparatus can estimate the behavior sign of the passenger also based on the age in months or age in weeks of the passenger. There is a research result (mental leap, etc.) that infants of a specific age in months or weeks are easily fussy. The cause is said to be rapid development of intelligence in the growth process. Therefore, the age in months or the age in weeks of the passenger is suitable as a factor for estimating the behavior sign.

Furthermore, according to the present disclosure, the information processing apparatus can present a route on the basis of the behavior sign of the passenger who is boarding. For example, the information processing apparatus presents a traveling route prioritized over the arrival time in a case of a period in which the sleep of the passenger is assumed, and presents a traveling route on which a temporary stop is easily performed in a case of a period in which the sleep is not assumed. For example, the information processing apparatus presents a route in which there are many commercial facilities with parking lots on a roadway side which is easy to enter from a traveling direction.

Furthermore, according to the present disclosure, the information processing apparatus can cause the in-vehicle user and the out-of-vehicle user to interact with each other according to the behavior sign of the passenger and whether or not the vehicle is moving.

Furthermore, according to the present disclosure, in an emergency, the information processing apparatus can start the interaction even without an operation of permitting an incoming call of the in-vehicle user.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus that communicates with a sensor device that transmits a video of a passenger and environmental information at least when a vehicle is moving, the information processing apparatus comprising:
a memory; and
a hardware processor coupled to the memory,
the hardware processor being configured to:
receive the video and the environmental information from the sensor device;
output the received video;
analyze information regarding a behavior sign of the passenger based on at least one of the received video and a change in the environmental information accompanying movement of the vehicle;
perform output control of changing an output way and outputting message information, based on an analysis result of the behavior sign;
present a drive plan to a user; and
perform navigation for guiding parking based on an analysis result of the behavior sign.

2. An information processing apparatus that communicates with a sensor device that transmits a video of a passenger and environmental information at least when a vehicle is moving, the information processing apparatus comprising:
a memory; and
a hardware processor coupled to the memory, the hardware processor being configured to:
receive the video and the environmental information from the sensor device;
output the received video;
analyze information regarding a behavior sign of the passenger based on at least one of the received video and a change in the environmental information accompanying movement of the vehicle;
perform output control of changing an output way and outputting message information, based on an analysis result of the behavior sign;
record childcare history information indicating a behavior history of the passenger before getting on the vehicle; and
estimate behavior of the passenger while riding based on the childcare history information.

3. The information processing apparatus according to claim 2, wherein the hardware processor is configured to:
further record information regarding age in months and/or age in weeks of the passenger; and
estimate behavior of the passenger while riding based on the childcare history information and the information regarding age in months and/or age in weeks.

4. The information processing apparatus according to claim 2, wherein the hardware processor is further configured to search for a route based on at least a destination, a scheduled riding time, and an estimation result of behavior of the passenger while riding.

5. An information processing apparatus that communicates with a sensor device that transmits a video of a passenger and environmental information at least when a vehicle is moving, the information processing apparatus comprising:
a memory; and
a hardware processor coupled to the memory, the hardware processor being configured to:
receive the video and the environmental information from the sensor device;
output the received video;
analyze information regarding a behavior sign of the passenger based on at least one of the received video and a change in the environmental information accompanying movement of the vehicle;
perform output control of changing an output way and outputting message information, based on an analysis result of the behavior sign;
control movement determination of determining whether or not the vehicle is moving, and switching of a plurality of modes related to output control;
allow an in-vehicle user to perform interactive processing with a device of an out-of-vehicle user; and
notify the device of the out-of-vehicle user of an analysis result of the behavior sign and presence or absence of the movement of the vehicle.

6. The information processing apparatus according to claim 5, wherein
the interactive processing includes at least a normal mode and an emergency mode,
in the normal mode, the interactive processing is started when receiving an operation of permitting an incoming call by the in-vehicle user, in the emergency mode, the interactive processing is started even when the in-vehicle user performs no operation of permitting an incoming call, and the hardware processor is configured to permit the emergency mode based on the analysis result of the behavior sign.

\* \* \* \* \*